(12) United States Patent
Choi et al.

(10) Patent No.: US 10,068,551 B1
(45) Date of Patent: Sep. 4, 2018

(54) LOCALIZED HIGH BRIGHTNESS MODE

(71) Applicant: Microsoft Technology Licensing, LLC, Redmond, WA (US)

(72) Inventors: Minhyuk Choi, Redmond, WA (US); Andrew N. Cady, Kirkland, WA (US); Ying Zheng, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/582,959

(22) Filed: May 1, 2017

(51) Int. Cl.
*G09G 5/10* (2006.01)
*G06F 3/0488* (2013.01)
*G06F 3/041* (2006.01)

(52) U.S. Cl.
CPC .............. *G09G 5/10* (2013.01); *G06F 3/041* (2013.01); *G06F 3/0488* (2013.01); *G09G 2310/027* (2013.01); *G09G 2320/0646* (2013.01)

(58) Field of Classification Search
CPC ............. G09G 5/10; G09G 2320/0646; G09G 2310/027; G06F 3/0488; G06F 3/041
See application file for complete search history.

(56) References Cited

U.S. PATENT DOCUMENTS

| | | | |
|---|---|---|---|
| 8,013,839 B2 | 9/2011 | Ording et al. | |
| 8,537,132 B2 | 9/2013 | Ng et al. | |
| 9,310,940 B2 | 4/2016 | Brosnan | |
| 9,424,769 B2 | 8/2016 | Chiu et al. | |
| 2004/0184027 A1 | 9/2004 | Mizutani et al. | |
| 2006/0181521 A1 | 8/2006 | Perreault et al. | |
| 2009/0021487 A1 | 1/2009 | Tien | |
| 2010/0208953 A1 | 8/2010 | Gardner et al. | |
| 2014/0375704 A1 | 12/2014 | Bi et al. | |
| 2015/0364107 A1 | 12/2015 | Sakariya et al. | |
| 2016/0247482 A1 | 8/2016 | Zeng et al. | |

FOREIGN PATENT DOCUMENTS

WO 2016205832 A1 12/2016

OTHER PUBLICATIONS

Maddala, Sekhar, "On-screen fingerprint scanners to make Smartphones bezel-less; CrucialTec ready to deliver in 2017", http://www.chaprama.com/2017/02/onscreen-fingerprint-scanners-to-make-smartphones-beez-less.html, Published on: Feb. 2017, 3 pages.

Holz, et al., "Fiberio: A Touchscreen that Senses Fingerprints", In Proceedings of the 26th annual ACM symposium on User interface software and technology, Oct. 8, 2013, 10 pages.

"International Search Report and Written Opinion Issued in PCT Application No. PCT/US2018/028459", dated Jun. 26, 2018, 15 Pages.

*Primary Examiner* — Maurice L McDowell, Jr.
(74) *Attorney, Agent, or Firm* — Holzer Patel Drennan (57) ABSTRACT

An electronic device includes a first digital-to-analog converter (DAC) configured to provide brightness control for a first subset of pixels of a display and a second DAC configured to provide brightness control for a second subset of pixels of the display. A display controller selectively operates the second DAC to provide the brightness control for the second subset of pixels while simultaneously operating the first DAC to provide the brightness control for the first subset of pixels of the display.

20 Claims, 4 Drawing Sheets

LOCALIZED HIGH BRIGHTNESS MODE

BACKGROUND

Some electronic devices employ fingerprint scanning as a means of user authentication. Fingerprint scanners can be capacitive or optical. Capacitive fingerprint scanners utilize electrical current to sense a fingerprint image by detecting changes in capacitive coupling between ridges and valleys of a fingertip. Optical scanners, in contrast, illuminate the fingertip with light to image light and dark areas corresponding to ridges and valleys of the fingertip.

Many devices with fingerprint sensing technology reserve an external "fingerprint scanning" area on the device that is separate from the display screen. This reservation of space has the effect of limiting a maximum display size. There exist a number of challenges in placing a fingerprint scanner below a full-screen display.

SUMMARY

Implementations described and claimed herein provide an electronic device including a first digital-to-analog converter (DAC) configured to provide brightness control for a first subset of pixels of a display and a second DAC configured to provide brightness control for a second subset of pixels of the display. The electronic device further includes a display controller stored in memory and executable by a processor to operate the second DAC to provide the brightness control for the second subset of pixels while simultaneously operating the first DAC to provide the brightness control for the first subset of pixels of the display.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

In optical fingerprint scanning systems, bright illumination of a fingertip is conducive to higher image resolution. Yet, many existing electronic devices include display controls that inherently limit a brightness differential of simultaneously-illuminated display pixels. Consequently, these systems lack the ability to provide for very high brightness in a localized area while simultaneously providing for very low brightness in other areas of a display screen. In such systems, optical fingerprint scanning may be achieved by including an optical fingerprint scanner in a region completely separate from a primary display or, alternatively, by including a fingerprint sensor below the display but limiting fingerprint scanning to scenarios where the entire display screen is sufficiently bright. Since brightening the entire display screen is a drain on battery and may be visually undesirable for product implementation, optical fingerprint scanning is not typically performed in devices with full-screen displays.

The herein disclosed technology realizes a "localized high brightness mode" that facilitates localized illumination of some pixels of a display at very high brightness values while illuminating other pixels of the display at much lower brightness values, such as brightness values that may be employed during a battery-saving standby mode of the device.

Figure 1:
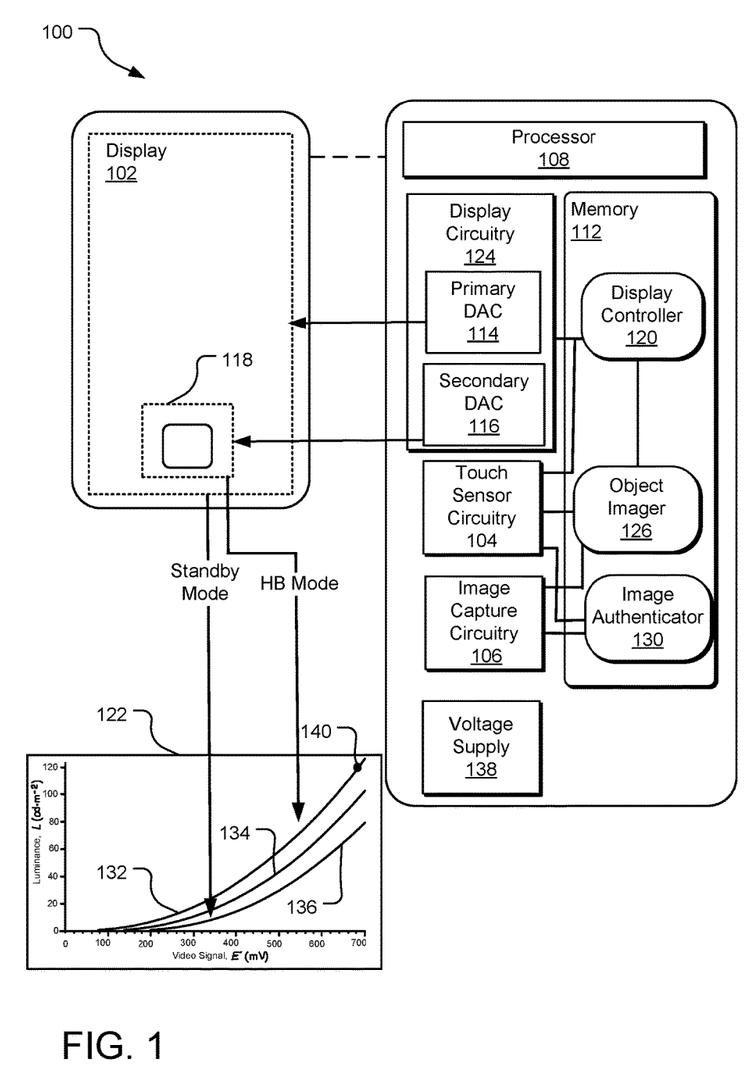
FIG. 1 illustrates an electronic device with display circuitry that provides a localized high brightness mode feature.

FIG. 1 illustrates a processing device 100 with display circuitry 124 that provides a localized high brightness mode feature. The processing device 100 includes a display 102 further including an array of independently controllable pixels. In one implementation, the display 102 includes both a display panel and a backpanel (not shown) that provides light for the display panel. The backpanel may include one or more fluorescent tubes, electro-luminescent devices, gaseous discharge lamps, LEDs, plasma panels, or any combination thereof. In another implementation, the processing device 100 does not include a backpanel. For example, the display 102 may be an organic light emitting diode display (OLED) including an emissive electroluminescent layer that emits its own light in response to electrical current.

A display controller 120 controls the display circuitry 124 to operate the display 102, such as by providing control signals to the display circuitry 124 to set operating values for different display parameters, such as pixel brightness. The display circuitry 124, which may be provided on one or more integrated circuit (IC) chips, includes at least two digital-to-analog converters (e.g., primary DAC 114 and a secondary DAC 116). Each of the two digital-to-analog converters is operable to receive display parameter values from the display controller 120 and to convert the received display parameter values into analog control signals. The display circuitry 124 provides the analog control signals generated by each DAC to one or more components of the display 102 such as the backpanel, display panel, or both, depending upon the particular type of operating parameter associated with the specified operating value. The display circuitry 124 may modify or further adjust the analog control signals and may combine the analog control signals with other inputs to operate the backlight at the operating level specified by the display controller 120.

The primary DAC 114 and the secondary DAC 116 are each controllable to provide brightness control for a select subset of pixels of the display 102. In some devices, brightness control entails implementation of a series of output voltage adjustments defined by a non-linear function referred to as a "gamma correction curve" or a "gamma curve." FIG. 1 includes an example plot 122 that illustrates three example gamma curves 132, 134, and 136, each corresponding to a predefined input/output voltage relationship designed to ensure that equal increments in pixel value translate to equal perceived changes in brightness. For example, the display controller 120 and/or display circuitry 124 may utilize a table including values representative of points on one of the gamma curves 132, 134, and 136 to adjust pixel voltages corresponding to photon counts of an optical sensor to ensure that equal increments in photon counts are visually represented in a manner that humans perceive as equal changes in brightness.

Adjusting output voltages to be non-linear in this manner has the effect of allocating more available bits (e.g., 256 bits to represent 256 greyscale values) to the types of highlights that humans can differentiate. For example, it is known that humans have greater sensitivity to relative differences between darker tones than between lighter tones. Ultimately, these output voltage adjustments facilitate delivery of a higher visual quality picture with a lower display resolution.

At any given time, each digital-to-analog converter (e.g., the primary DAC 114 and the secondary DAC 116) provides brightness control according to one predefined gamma curve (e.g., one of the gamma curves 132, 134, and 136). When, for example, the processing device 100 is operating according to a low brightness setting, such as during a low-power or "standby" mode, the primary DAC 114 may provide output voltages that follow a relationship defined by the gamma curve 136. In this mode, a full range of greyscale values (e.g., represented as 256 bits) is captured using lower output voltages than when the processing device 100 is operating according to a higher brightness setting (e.g., higher power mode), such as a brightness setting corresponding to the gamma curve 132 or the gamma curve 134.

When the processing device 100 exits the low brightness setting, the display controller 120 may recalibrate and instruct the primary DAC 114 to provide output voltages that follow a different, higher-power gamma curve, such as the gamma curve 132. This recalibration provides for an overall increase in brightness of the available pixel values at the expense of increased power drain on a voltage supply 138.

When all pixels in the display 102 are controlled by a single digital-to-analog converter (e.g., the primary DAC 114) and according to a low brightness setting, such as according to the gamma curve 136, the maximum available output voltage (and therefore, maximum pixel brightness) may be inherently limited to the maximum value on the corresponding gamma curve. For example, a point 140 on the gamma curve 132 represents a brightness that is not achievable in some devices when input/output voltages are controlled according to the gamma curve 136. As a result, devices implementing gamma correction with a single digital-to-analog converter may be unable to illuminate some pixels according to very low brightness values while simultaneously illuminating a few select pixels at very high brightness values (such as in the range of 800-1000 cd/m$^2$, as shown in the plot 122).

In the processing device 100, the above-described localized high brightness capability is realized by simultaneously employing two digital-to-analog converters to independently provide brightness control to select pixels of the display 102 according to two different respective gamma curves. This capability may be useful in a variety of applications, including without limitation applications that implement optical imaging for fingerprint authentication.

As mentioned above, optical imaging for fingerprint authentication may be performed by illuminating a localized area with a high brightness to achieve a high-resolution image. Some electronic devices utilize fingerprint authentication to "unlock" a device from a particular mode of operation, such as to allow a device to exit a low-power or standby mode. A fingerprint scan to exit a standby mode is, therefore, one example of a situation for which it may be desirable to brightly illuminate some display pixels (e.g., in a fingerprint scanning region) while dimly illuminating other pixels.

The display controller 120 selectively instructs either the primary DAC 114 or the secondary DAC 116 to provide brightness control for a common subset (e.g., a subset 118) of pixels of the display 102. In one implementation, the display controller 120 initially instructs the primary DAC 114 to provide brightness control to all pixels of the display 102 according to a first brightness setting. Subsequently, the display controller 120 instructs the secondary DAC 116 to temporarily assume brightness control of a subset 118 of the pixels of the display 102 from the primary DAC 114. For example, the display controller 120 instructs the secondary DAC 116 to emit control signals for pixels of the subset 118, and these control signals then override conflicting control signals for the same pixels generated by the primary DAC 114.

The control signals generated by the secondary DAC 116 may, for example, provide for localized high brightness control according to a high brightness setting, such as that illustrated by the gamma curve 132, while the control signals generated by the primary DAC 114 provide brightness control according to a lower brightness setting, such as that illustrated by the gamma curves 134 or 136. While the secondary DAC 116 is actively transmitting control signals for the pixels of the subset 118 according to the high brightness setting, the primary DAC 114 may continue to provide brightness control for the remaining pixels in the display 102 at the lower brightness setting (e.g., excluding those pixels in the subset 118). This simultaneous, dual-brightness mode of operation is also referred to herein as a "localized high brightness (HB) mode."

In one implementation, the display controller 120 dynamically assesses received user input(s) to determine whether to select either the primary DAC 114 or the secondary DAC 116 to provide brightness control for the pixels of the subset 118. For example, the display controller 120 may initially instruct the primary DAC 114 to provide brightness control for all pixels in the display 102 and, responsive to receipt of touch or other input satisfying predefined criteria, selectively instruct the secondary DAC 116 to temporarily assume brightness control of the pixels in the subset 118. For example, the secondary DAC 116 may illuminate pixels in the subset 118 in a high brightness mode (e.g., according to a first gamma curve) while the primary DAC 114 continues to illuminate remaining pixels of the display in a low brightness mode (e.g., according to a second gamma curve).

In different implementations, the processing device 100 may initiate a localized high brightness mode responsive to different triggers. For example, touch sensor circuitry 104 may include one or more touch sensors adapted to detect touch input satisfying certain criteria. A user may, for example, perform a certain gesture on the display 102 and/or interact with a certain portion of the display 102 to instruct the processing device 100 to initiate a localized high brightness mode.

In FIG. 1, the processing device 100 includes an object imager 126 that receives feedback from one or more of the display controller 120, the display circuitry 124, and the touch sensor circuitry 104 to determine when the display 102 is being operated in a localized high brightness mode. Responsive to feedback indicating that the localized high brightness mode is currently in operation for pixels in the subset 118, the object imager 126 instructs the image capture circuitry 106 to image an object adjacent to the processing device that is illuminated by the pixels in the subset 118. The image captured by the image capture circuitry 106 is processed and analyzed by an image authenticator 130 to determine whether or not the captured image satisfies predefined authentication criteria. When, for example, the captured image satisfies the predefined authentication criteria, the image authenticator 130 grants the user access to requested secure information, such as by unlocking the processing device 100 from a standby mode, allowing the user to make a purchase with digital wallet technology, or granting the user access to specific secure data stored on the processing device 100. When, however, the captured image does not satisfy the predefined authentication criteria, the image authenticator 130 may deny the user access to the requested secure information.

In some implementations, fingerprint scanning is performed using the localized high brightness mode responsive to a trigger that does not include touch input. For example, a user may provide a voice command and/or an application may automatically cause the processing device 100 to enter the localized high brightness mode.

The above-described localized high brightness mode may be utilized in a variety of scenarios regardless of a current operating mode of the processing device 100. As described above, a localized high brightness mode may, in some cases, be entered when the processing device 100 is operating in a standby mode. In other cases, the localized high brightness mode is entered when the processing device 100 is not operating in a standby mode.

In different implementations, the processing device 100 may assume a variety of forms including without limitation a mobile phone (as shown), a tablet, laptop, smart watch, smart home appliance, ATM, or other device with a display, including without limitation devices with integrated optical fingerprint scanning. Aspects of the display controller 120, object imager 126, and image authenticator 130 may be stored in memory of the processing device 100 or memory of another device communicatively coupled to the processing device 100 in a wired or wireless network.

Figure 2:
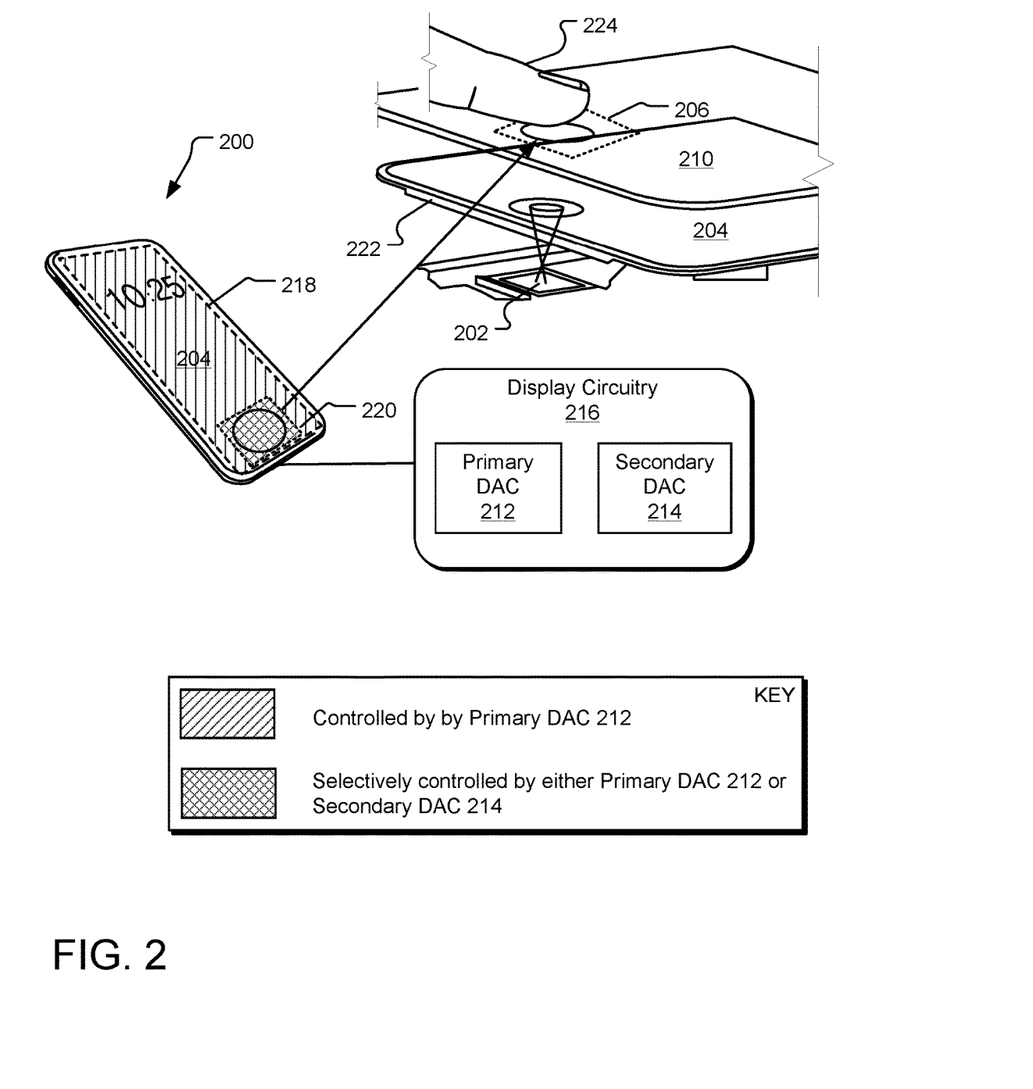
FIG. 2 illustrates an electronic device including display circuitry that provides a localized high brightness mode feature responsive to touch input.

FIG. 2 illustrates an example processing device 200 including display circuitry 216 that implements a localized high brightness mode responsive to touch input. Specifically, the processing device 200 includes an optical sensor 202 embedded beneath a full-screen display 204. The optical sensor 202 is sized and positioned to image an object adjacent to a fingerprint scanning region 206 of a display surface (e.g., a protective glass screen 210) of the full-screen display 204.

The full-screen display 204 is a light-emitting display including an array of independently controllable pixels. The display circuitry 216 of the processing device 200 includes, among other components, two digital-to-analog (DAC) converters for controlling pixel brightness levels of various pixels in the array. Specifically, the display circuitry 216 includes a primary DAC 212 configured to independently control brightness of a first subset of pixels bounded by a region 218 and a secondary DAC 214 configured to independently control brightness of a second subset of pixels bounded by a region 220. In the illustrated example, the first subset of pixels in the region 218 includes all or substantially all pixels of the full-screen display 204 while the second subset of pixels in the region 220 includes pixels that are within the fingerprint scanning region 206.

In FIG. 2, the pixels of the second subset in the region 220 are also included in the first subset of pixels bounded by the region 218. Consequently, the primary DAC 212 and the secondary DAC 214 are each independently selectable to provide brightness control of the pixels in the second subset within the region 220.

In different implementations, the second subset of pixels may vary in size and placement relative to the other pixels of the full-screen display 204, such as other pixels that are primarily or exclusively controlled by the primary DAC 212. For example, the second subset of pixels may encompass a larger or smaller portion of the full-screen display 204 than the region 220 shown in FIG. 2. In some implementations, the second subset of pixels includes contiguously arranged pixels (as shown); in other implementations, the second subset includes non-contiguously arranged pixels.

A controller (not shown) of the processing device 200 selectively operates the primary DAC 212 and the secondary DAC 214 to provide brightness control for the second subset of pixels bounded by the region 220. For example, the controller may initially instruct the primary DAC 212 to provide brightness control for the first subset of pixels bounded by the region 218 (e.g., including all or substantially all pixels in the full-screen display 204) and, subsequently, instruct the secondary DAC 214 to "take over" the operation of brightness control for the pixels in the second subset bounded by the region 220. While the secondary DAC 214 is actively providing brightness control signals to the second subset of pixels in the region 220, the primary DAC 212 may continue to simultaneously provide brightness control for the other pixels of the full-screen display 204 excluded from the region 220.

Embedded below the full-screen display 204 is a touch sense layer 222 for sensing a user's interactions with the full-screen display 204. The touch sense layer 222 is coupled to touch circuitry (not shown) that manages and controls touch detection (e.g., stylus-based detection and/or finger based detection) for the full-screen display 204. The touch inputs collected by the touch sense layer 222 are received and processed by the controller to determine whether the touch inputs satisfy predefined touch criteria. In different implementations, the predefined touch criteria may be satisfied under different conditions, such as in response to detection of a recognizable gesture (e.g., tapping or swiping) and/or a recognized gesture pattern. In some implementations, the predefined touch criteria are satisfied when the user provides a certain type of touch input within a defined area of the full-screen display 204, such as within the fingerprint scanning region 206.

In different implementations, the touch sense layer 222 may employ different types of touch sense technology. In one implementation, the touch sense layer 222 includes a grid-based capacitive sensor operative to detect changes in localized capacitance caused by a human finger, hand, or other objects in close proximity to the fingerprint scanning region 206. In another implementation, the touch sense layer 222 includes a digitizer sensor operable to detect an electromagnetic signal emitted by an active stylus. In yet another implementation, the touch sense layer 222 includes a plurality of pressure sensors operable to detect pressure applied to the full-screen display 204.

In a first brightness mode of the processing device 200, the touch sense layer 222 collects touch inputs while a controller selectively instructs the primary DAC 212 to provide brightness control of the pixels in the first subset in the region 218 including those pixels that are also in the second subset in the region 220. The primary DAC 212 maintains brightness control of all pixels in the first subset according to a first brightness setting (e.g., a first gamma curve) so long as the collected touch inputs do not satisfy the predefined touch criteria.

When it is subsequently determined that the collected touch inputs do satisfy the predefined touch criteria, the controller initiates a second brightness mode of the processing device by selectively instructing the secondary DAC 214 to provide brightness control to pixels of the second subset in the region 220 according to a second brightness setting (e.g., a second gamma curve). This instruction has the effect of temporarily revoking brightness control of such pixels from the primary DAC 212 and re-assigning this control to the secondary DAC 214.

During the time that the secondary DAC 214 is actively controlling brightness of the pixels in the second subset in the region 220 according to the second brightness setting, the primary DAC 212 continues to provide brightness control for the remaining pixels in the full-screen display 204 according to the first brightness setting. While the primary DAC 212 and secondary DAC 214 are simultaneously operated to provide brightness control to pixels in different regions of the full-screen display 204, the optical sensor 202 may be employed to collect and measure light reflected off a user's finger 224. For example, the first brightness setting may be used in a low-power, low-brightness mode (e.g., a standby mode) and the second brightness setting may be used when imaging the user's finger 224 positioned adjacent to the fingerprint scanning region 206.

In different implementations, the primary DAC 212 and the secondary DAC 214 may provide for different pixel resolutions depending on design criteria and the specific uses for which the disclosed technology is employed. In one implementation, the primary DAC 212 and the secondary DAC 214 are identical. For example, the primary DAC 212 and the secondary DAC 214 may each be an 8 or 10 bit DAC. In another implementation, the primary DAC 212 and the secondary DAC 214 are non-identical and the secondary DAC 214 provides for a lower greyscale resolution than the primary DAC 212. For example, the primary DAC 212 is an 8 bit DAC that provides for 256 shades of greyscale, while the secondary DAC 214 is a 2 or 4 bit DAC providing 4 or 16 shades of greyscale, respectively.

Figure 3:
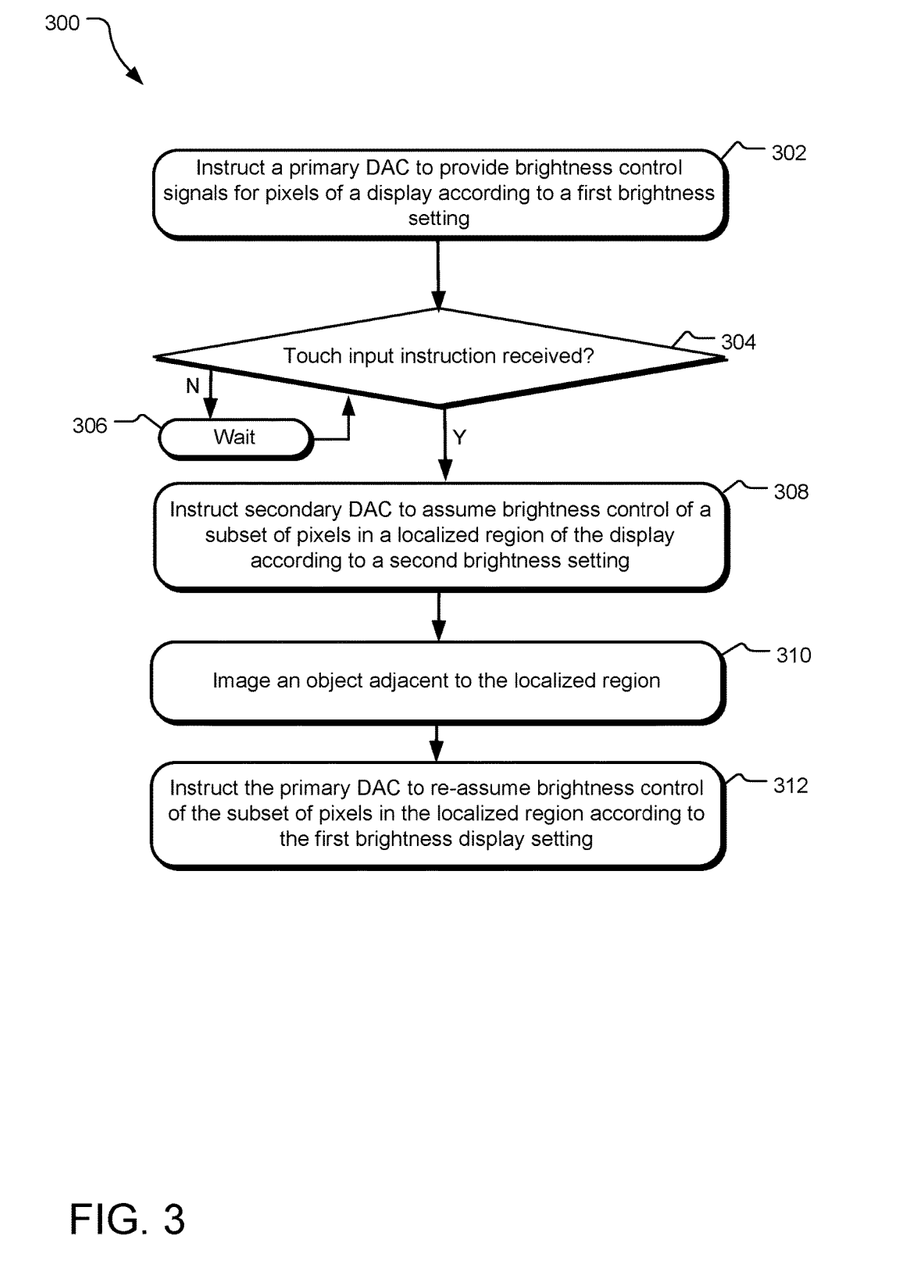
FIG. 3 illustrates example operations for initiating a localized high brightness mode in an electronic device.

FIG. 3 illustrates example operations for initiating a localized high brightness mode in an electronic device. An instruction operation 302 instructs a primary digital-to-analog converter (DAC) to provide brightness control signals to all or substantially all pixels of a light-emitting display according to a first brightness setting of the electronic device. The first brightness setting is, for example, defined by a series of brightness adjustments stored in memory and associated with a first gamma curve.

A determination operation 304 dynamically determines whether the electronic device has received a touch input instruction (e.g., touch input that satisfies predetermined touch criteria). The predetermined touch criteria may be satisfied when, for example, touch sense circuitry of the electronic device gathers touch input indicating that a user has performed a predefined gesture or pattern of gestures on the display. For example, the touch input criteria may specify conditions pertaining to a specific region of a display or one or more conditions pertaining to a current device mode (e.g., standby mode vs. active use mode).

If the determination operation 304 determines that a touch input instruction has not been received, a waiting operation 306 is entered until the determination operation 304 determines that the touch input instruction has been received. Responsive to receipt of the touch input instruction, another instruction operation 308 instructs a secondary DAC to assume brightness control of a subset of the pixels in a localized region of the display and to provide brightness control signals to the subset of pixels according to a second brightness setting of the electronic device. The second brightness setting is, for example, defined by a series of brightness adjustments stored in memory and associated with a second gamma curve different from the gamma curve defining brightness adjustments for the first brightness setting. In one implementation, the second brightness setting is a high brightness setting and the first brightness setting is a setting providing for a comparatively lower brightness, such as a power-saving (e.g., standby) setting.

During the time that the secondary DAC is actively providing brightness control signals to the pixels within the localized region according to the second brightness setting, the primary DAC continues to actively provide brightness control signals to the remaining pixels in the display according to the first brightness setting while an imaging operation 310 images an object that is adjacent to the localized region illuminated according to the second brightness setting.

After the imaging operation 310 is complete, another instruction operation 312 instructs the primary DAC to re-assume brightness control of the subset of pixels in the localized region, effectively revoking brightness control of such pixels from the secondary DAC. The primary DAC again manages brightness of the full display according to the first brightness setting.

Figure 4:
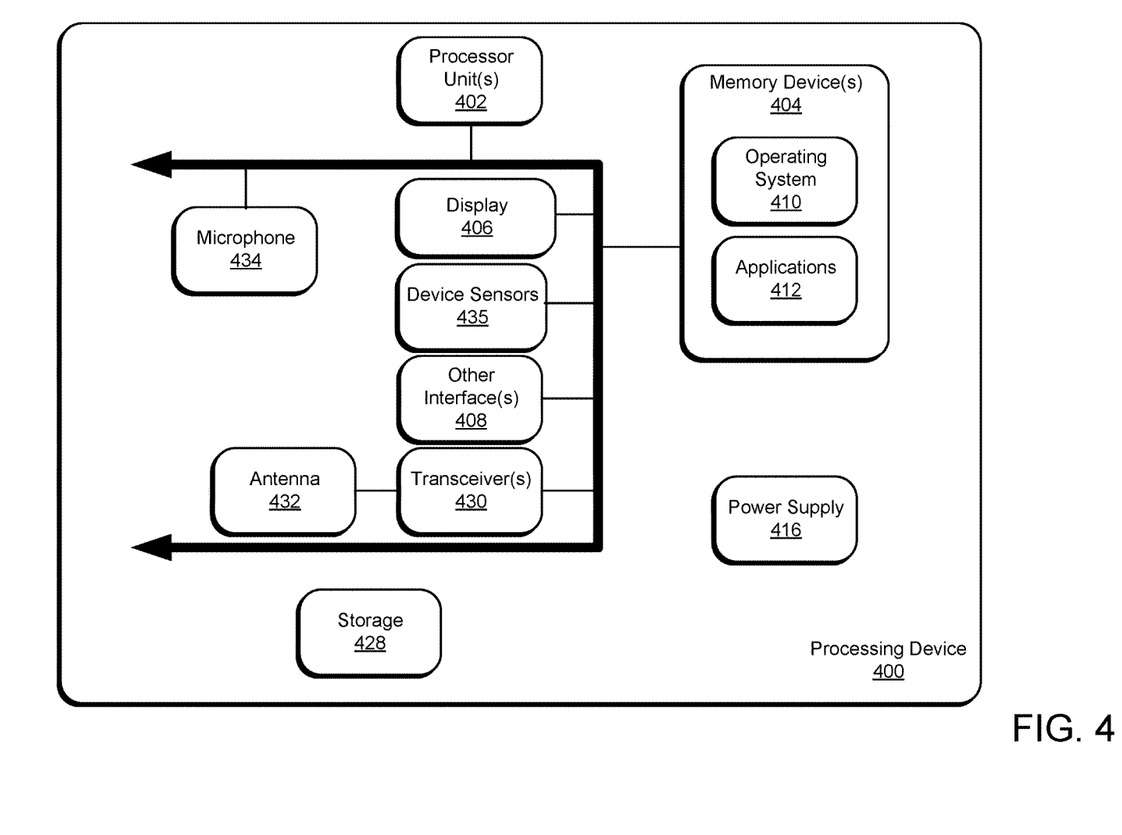
FIG. 4 illustrates an example schematic of a processing device suitable for implementing a localized high brightness mode.

FIG. 4 illustrates an example schematic of a processing device 400 suitable for inclusion of a highly-reflective (e.g., metallic) display or a reflective interactive writing surface. The processing device 400 includes one or more processing unit(s) 402, one or more memory 404, a display 406, and other interfaces 408 (e.g., buttons). The memory 404 generally includes both volatile memory (e.g., RAM) and non-volatile memory (e.g., flash memory). An operating system 410, such as the Microsoft Windows® operating system, the Microsoft Windows® Phone operating system or a specific operating system designed for a gaming device, resides in the memory 404 and is executed by the processing unit(s) 402, although it should be understood that other operating systems may be employed.

One or more applications 412, such as a display controller, object image, or image authenticator are loaded in the memory 404 and executed on the operating system 410 by the processing unit(s) 402. The applications 412 may receive input from the display 406 and/or a digitizer sensor 435 embedded within or beneath the display 406. The processing device 400 includes a power supply 416, which is powered by one or more batteries or other power sources and which provides power to other components of the processing device 400. The power supply 416 may also be connected to an external power source that overrides or recharges the built-in batteries or other power sources.

The processing device 400 includes one or more communication transceivers 430 and an antenna 432 to provide network connectivity (e.g., a mobile phone network, Wi-Fi®, BlueTooth®). The processing device 400 may also include various other components, such as a positioning system (e.g., a global positioning satellite transceiver), one or more accelerometers, one or more cameras, an audio interface (e.g., a microphone 434, an audio amplifier and speaker and/or audio jack), and storage devices 428. Other configurations may also be employed.

In an example implementation, a mobile operating system, various applications (including a stylus position detection engine) and other modules and services may be embodied by instructions stored in memory 404 and/or storage devices 428 and processed by the processing unit(s) 402. The memory 404 may be memory of host device or of an accessory that couples to a host.

The processing device 400 may include a variety of tangible computer-readable storage media and intangible computer-readable communication signals. Tangible computer-readable storage can be embodied by any available media that can be accessed by the processing device 400 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing device 400. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

An example electronic device disclosed herein includes a first digital-to-analog converter (DAC) configured to provide brightness control for a first subset of pixels of a display and second DAC configured to provide brightness control for a second subset of pixels of the display. The electronic device further includes a display controller stored in memory and executable by a processor to operate the second DAC to provide the brightness control for the second subset of pixels of the display while simultaneously operating the first DAC to provide the brightness control for the first subset of pixels of the display.

In another example electronic device of any preceding electronic device, the display controller is further configured to operate the second DAC to provide the brightness control for the second subset of pixels according to a high brightness setting while operating the first DAC to provide the brightness control for the first subset of pixels according to a comparatively low brightness setting.

In another example electronic device of any preceding electronic device, the display controller is further configured to operate the first DAC to simultaneously provide brightness control for both the first subset of pixels and the second subset of pixels and to selectively operate the second DAC to assume brightness control for the second subset of pixels from the first DAC responsive to detection of user input satisfying predefined criteria.

In still another example electronic device of any preceding electronic device, the display controller is configured to selectively operate the second DAC to assume the brightness control for the second subset of pixels from the first DAC responsive to detection of touch input received while the electronic device is in a standby mode.

Yet another example electronic device of any preceding electronic device includes a touch sensor and also includes an object imager stored in memory and executable by a processor to operate a camera to image an object responsive to detection of touch input by the touch sensor that satisfies predefined touch criteria, the object positioned within a region illuminated by the second subset of pixels.

In another example electronic device of any preceding electronic device, the second DAC provides the brightness control for the second subset of pixels according to a first gamma curve while the first DAC provides the brightness control for the first subset of pixels according to a second gamma curve.

Yet another example electronic device of any preceding electronic device includes an object imager stored in memory and executable by a processor to operate a camera to image an object illuminated by the second subset of pixels while the second DAC provides the brightness control for the second subset of pixels according to a high brightness setting and while the first DAC provides the brightness control for the first subset of pixels according to a comparatively low brightness setting. The electronic device further includes an image authenticator stored in the memory and executable by the processor to determine whether the image satisfies authentication criteria.

In still another example electronic device of any preceding electronic device, the second subset of pixels are contiguously arranged.

An example method disclosed herein provides for operating a first digital-to-analog converter (DAC) of an electronic device to provide brightness control for a first subset of pixels in a display while simultaneously operating a second DAC of the electronic device to provide brightness control for a second subset of pixels of the display.

In another example method of any preceding method, the first DAC provides the brightness control for the first subset of pixels according to a first brightness setting while the second DAC provides the brightness control for the second subset of pixels according to a second different brightness setting.

Yet another example method of any preceding method includes operating the first DAC to provide the brightness control for both the first subset of pixels and the second subset of pixels of the display; and responsive to detection of a predefined user input, selectively operating the second DAC to provide the brightness control for the second subset of pixels.

In yet another example method of any preceding method, the predefined user input is received while the electronic device is in a standby mode.

Yet another example method of any preceding method further includes operating a camera to image an object while the second DAC is providing the brightness control for the second subset of pixels, the object positioned within a region illuminated by the second subset of pixels.

Still another example method of any preceding method includes determining whether the image of the object satisfies authentication criteria; and operating the first DAC to provide the brightness control for the second subset of pixels from the second DAC responsive to a determination that authentication criteria is satisfied.

In another example method of any preceding method, the second DAC provides the brightness control for the second subset of pixels according to a first gamma curve while the first DAC provides the brightness control for the first subset of pixels according to a second gamma curve.

In still another example method of any preceding method, the second subset of pixels are contiguously arranged.

An example electronic device disclosed herein includes a light-emitting display including an array of pixels and a display controller stored in memory and executable by a processor to operate a first digital-to-analog converter (DAC) to control brightness of both a first subset of pixels in the array and a second subset of pixels in the array. Responsive to touch input satisfying predefined criteria, the display controller selectively operates a second DAC to control the brightness of the second subset of pixels while continuing to operate the first DAC to provide the brightness control for the first subset of pixels in the array.

Yet another example electronic device of any preceding electronic device includes an object imager stored in memory and executable by the processor to operate a camera to capture an image of an object positioned within a region illuminated by the second subset of pixels while the second DAC is controlling the brightness of the second subset of pixels.

In still another example electronic device of any preceding electronic device, the controller selectively operates the second DAC responsive to detection of touch input satisfying predefined touch criteria.

Yet another example electronic device of any preceding electronic device includes an image authenticator stored in memory and executable by the processor to grant access to secure information on the electronic device responsive to a determination that the captured image satisfies authentication criteria.

An example electronic device disclosed herein includes a means for operating a first digital-to-analog converter (DAC) of an electronic device to provide brightness control for a first subset of pixels in a display while simultaneously operating a second DAC of the electronic device to provide brightness control for a second subset of pixels of the display.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. An electronic device comprising:
  a first digital-to-analog converter (DAC) configured to provide brightness control for a first subset of pixels of a display;
  a second DAC configured to provide brightness control for a second subset of pixels of the display; and
  a display controller stored in memory and executable by a processor to operate the second DAC to provide the brightness control for the second subset of pixels of the display while simultaneously operating the first DAC to provide the brightness control for the first subset of pixels of the display.

2. The electronic device of claim 1, wherein the display controller is further configured to operate the second DAC to provide the brightness control for the second subset of pixels according to a high brightness setting while operating the first DAC to provide the brightness control for the first subset of pixels according to a comparatively low brightness setting.

3. The electronic device of claim 1, wherein the display controller is further configured to operate the first DAC to simultaneously provide brightness control for both the first subset of pixels and the second subset of pixels and to selectively operate the second DAC to assume brightness control for the second subset of pixels from the first DAC responsive to detection of user input satisfying predefined criteria.

4. The electronic device of claim 3, wherein the display controller is configured to selectively operate the second DAC to assume the brightness control for the second subset of pixels from the first DAC responsive to detection of touch input received while the electronic device is in a standby mode.

5. The electronic device of claim 1, further comprising:
  a touch sensor; and
  an object imager stored in memory and executable by a processor to image an object responsive to detection of touch input by the touch sensor that satisfies predefined touch criteria, the object positioned within a region illuminated by the second subset of pixels.

6. The electronic device of claim 1, wherein the first DAC provides the brightness control for the first subset of pixels according to a first brightness mode while the second DAC provides the brightness control for the second subset of pixels according to a second brightness mode lower than the first brightness mode.

7. The electronic device of claim 1, further comprising:
  an object imager stored in memory and executable by a processor to image an object illuminated by the second subset of pixels while the second DAC provides the brightness control for the second subset of pixels according to a high brightness setting and while the first DAC provides the brightness control for the first subset of pixels according to a comparatively low brightness setting; and
  an image authenticator stored in the memory and executable by the processor to determine whether the image satisfies authentication criteria.

8. The electronic device of claim 1, wherein the second subset of pixels are contiguously arranged.

9. A method comprising:
  operating a first digital-to-analog converter (DAC) of an electronic device to provide brightness control for a first subset of pixels in a display while simultaneously operating a second DAC of the electronic device to provide brightness control for a second subset of pixels of the display.

10. The method of claim 9, wherein the first DAC provides the brightness control for the first subset of pixels according to a first brightness setting while the second DAC provides the brightness control for the second subset of pixels according to a second different brightness setting.

11. The method of claim 9, further comprising:
operating the first DAC to provide the brightness control for both the first subset of pixels and the second subset of pixels of the display; and
responsive to detection of a predefined user input, selectively operating the second DAC to provide the brightness control for the second subset of pixels.

12. The method of claim 11, wherein the predefined user input is received while the electronic device is in a standby mode.

13. The method of claim 11, further comprising:
imaging an object while the second DAC is providing the brightness control for the second subset of pixels, the object positioned within a region illuminated by the second subset of pixels.

14. The method of claim 13, further comprising:
determining whether the image of the object satisfies authentication criteria; and
operating the first DAC to provide the brightness control for the second subset of pixels responsive to a determination that authentication criteria is satisfied.

15. The method of claim 9, wherein the first DAC provides the brightness control for the first subset of pixels according to a first brightness mode while the first DAC provides the brightness control for the second subset of pixels according to a second brightness mode lower than the first brightness mode.

16. The method of claim 9, wherein the second subset of pixels are contiguously arranged.

17. An electronic device comprising:
a light-emitting display including an array of pixels; and
a display controller stored in memory and executable by a processor to:
operate a first digital-to-analog converter (DAC) to control brightness of both a first subset of pixels in the array and a second subset of pixels in the array; and
responsive to touch input satisfying predefined criteria, selectively operate a second DAC to control brightness of the second subset of pixels while continuing to operate the first DAC to control the brightness of the first subset of pixels in the array.

18. The electronic device of claim 17, further comprising:
an object imager stored in memory and executable by the processor to image an object positioned within a region illuminated by the second subset of pixels while the second DAC is controlling the brightness of the second subset of pixels.

19. The electronic device of claim 18, further comprising:
an image authenticator stored in memory and executable by the processor to grant access to secure information on the electronic device responsive to a determination that the captured image satisfies authentication criteria.

20. The electronic device of claim 17, wherein selectively operating the second DAC further comprises selectively operating the second DAC responsive to detection of touch input satisfying predefined touch criteria.

* * * * *